(12) United States Patent
Eliyahu et al.

(10) Patent No.: US 12,542,209 B2
(45) Date of Patent: Feb. 3, 2026

(54) AUTOMATIC CATHETER STABILITY DETERMINATION

(71) Applicant: Biosense Webster (Israel) Ltd., Yokneam (IL)

(72) Inventors: Shiran Eliyahu, Yokneam Illit (IL); Elad Azaria, Ramat Gan (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 445 days.

(21) Appl. No.: 17/157,161

(22) Filed: Jan. 25, 2021

(65) Prior Publication Data

US 2022/0238218 A1    Jul. 28, 2022

(51) Int. Cl.
*G16H 40/60* (2018.01)
*A61B 18/00* (2006.01)
*A61B 18/14* (2006.01)

(52) U.S. Cl.
CPC ......... *G16H 40/60* (2018.01); *A61B 18/1492* (2013.01); *A61B 2018/00696* (2013.01)

(58) Field of Classification Search
CPC ..... A61B 18/1492; A61B 18/14; A61B 18/12; A61B 2018/00696; A61B 18/00351; A61B 18/00839; A61B 18/00636; A61B 18/00773; A61B 18/00666; A61B 5/367; A61B 5/7267; A61B 5/067; A61B 5/389; A61B 5/065; A61B 2034/2051; A61B 2034/2046; A61B 2034/2048; G16H 40/60
See application file for complete search history.

(56) References Cited

U.S. PATENT DOCUMENTS

| | | | |
|---|---|---|---|
| 2011/0144657 A1* | 6/2011 | Fish | A61B 5/0538 606/130 |
| 2012/0029504 A1* | 2/2012 | Afonso | A61B 18/1492 606/34 |
| 2012/0184865 A1 | 7/2012 | Harlev et al. | |
| 2012/0226110 A1 | 9/2012 | Markowitz et al. | |
| 2013/0296845 A1* | 11/2013 | Bar-Tal | A61B 5/6852 606/34 |
| 2015/0313504 A1* | 11/2015 | Wittkampf | A61B 34/20 600/424 |
| 2016/0128770 A1 | 5/2016 | Afonso et al. | |
| 2016/0143686 A1* | 5/2016 | Tunay | A61B 18/1233 606/34 |
| 2017/0071650 A1 | 3/2017 | Bonyak et al. | |
| 2017/0224284 A1 | 8/2017 | Olson | |

OTHER PUBLICATIONS

Extended European Search Report dated Jun. 22, 2022 for European Patent Application No. 22152876.3.

* cited by examiner

*Primary Examiner* — Joseph A Stoklosa
*Assistant Examiner* — Marina Delaney Templeton
(74) *Attorney, Agent, or Firm* — Volpe Koenig

(57) ABSTRACT

A method for determining catheter stability is provided. The method is implemented by a determination engine stored as processor executable code in a memory coupled to one or more processors The method includes determining stability with respect to movement of a catheter and receiving electrical signals captured by the catheter in correlation to the stability. The method also include assigning a position in space to the electrical signals based on the stability.

20 Claims, 5 Drawing Sheets

AUTOMATIC CATHETER STABILITY DETERMINATION

FIELD OF INVENTION

The present invention is related to signal processing. More particularly, the present invention relates to automatic catheter stability determination.

BACKGROUND

A catheter can receive electronic signals from a surface of a body organ at each location that the catheter rests along a predefined period of time and provide the electronic signals to a system. The system can store a given number of the electronic signals associated with each location of the catheter. However, the electronic signals stored in the system may have been collected during less than optimal scenarios (from more than one of the locations) making part or all of this data irrelevant for medical diagnosis. In this regard, there are presently no techniques that use the catheter location that account for correcting, or at least improving, part or all of this irrelevant data.

SUMMARY

According to an exemplary embodiment, a method for determining catheter stability is provided. The method is implemented by a determination engine stored as processor executable code in a memory coupled to one or more processors. The method includes determining stability with respect to movement of a catheter and receiving electrical signals captured by the catheter in correlation to the stability. The method also includes assigning a position in space to the electrical signals based on the stability.

According to one or more embodiments, the exemplary method embodiment above can be implemented as an apparatus, a system, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Disclosed herein is a method and system for signal processing. More particularly, the present invention relates to a signal processing method and system, embodied in a determination engine that uses machine learning/artificial intelligence, that provides automatic catheter stability determination. For example, the determination engine is a processor executable code or software that is necessarily rooted in process operations by, and in processing hardware of, medical device equipment. For ease of explanation, the determination engine is described herein with respect to mapping a heart; however, any anatomical structure, body part, organ, or portion thereof can be a target for mapping by the determination engine described herein.

Generally, the determination engine stores electrical signals detected by a catheter in correlation to specific locations in a bit buffer based on catheter stability. Catheter stability, as described herein, relates to a determination that the catheter is at a given location (e.g., a first location) for a period of time. According to an exemplary embodiment, the determination engine determines stability information with respect to movement of a catheter, receives electrical signals captured by the catheter in correlation to the stability information, and assigs a position in space to the electrical signals based on the stability information.

One or more advantages, technical effects, and/or benefits of the determination engine can include providing cardiac physicians and medical personnel a way to determine stability of a catheter while acquiring data (such as acquiring electro-anatomical points). Thus, the determination engine particularly utilizes and transforms medical device equipment to enable/implement more accurate and reliable data when the catheter is stable that are otherwise not currently available or currently performed by cardiac physicians and medical personnel.

Figure 1:
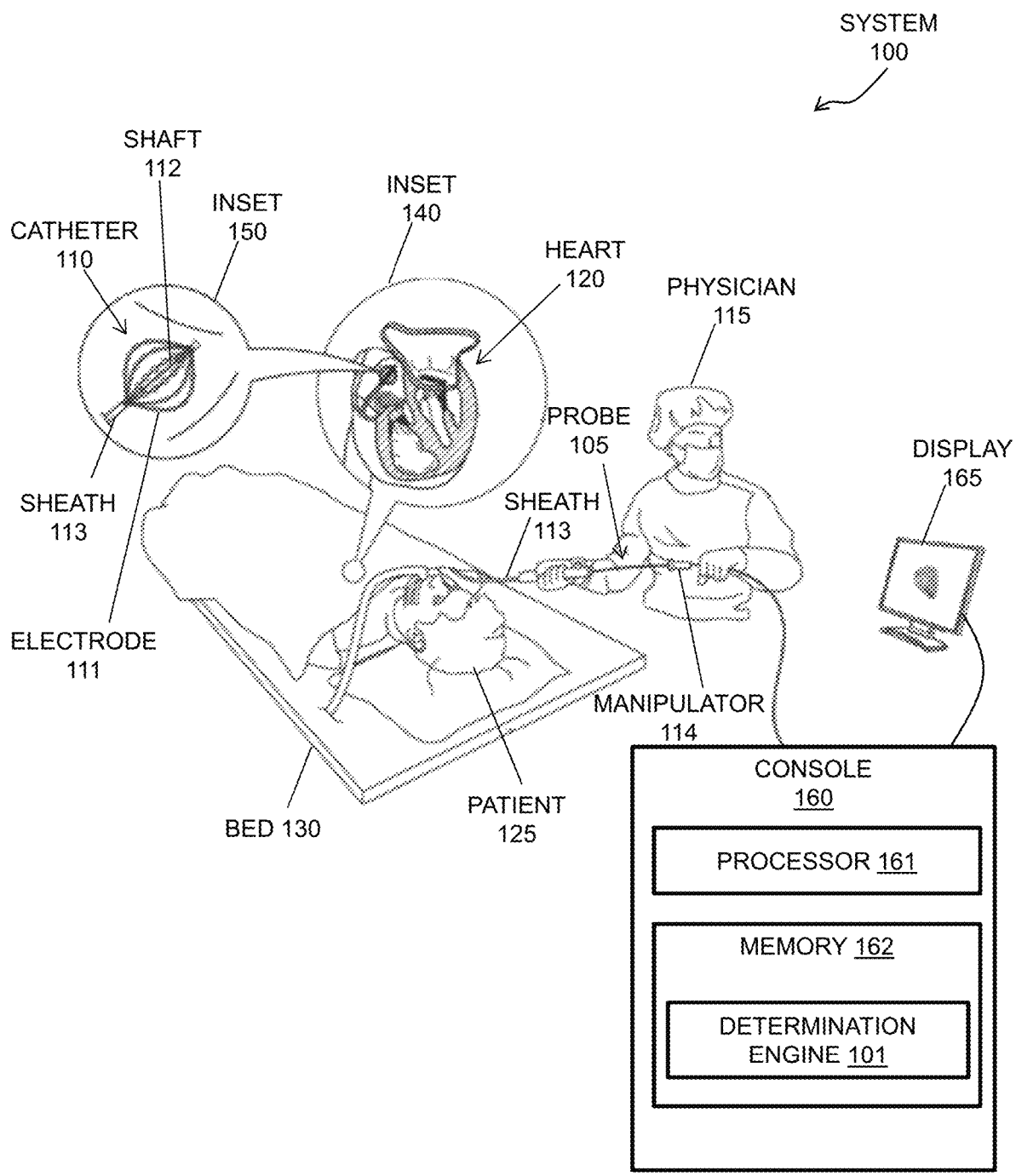
FIG. 1 illustrates a diagram of an exemplary system in which one or more features of the disclosure subject matter can be implemented according to one or more embodiments.

FIG. 1 is a diagram of an example system (e.g., medical device equipment), shown as a system 100, in which one or more features of the subject matter herein can be implemented according to one or more embodiments. All or part of the system 100 can be used to collect information (e.g., biometric data and/or a training dataset) and/or used to implement a machine learning and/or an artificial intelligence algorithm (e.g., a determination engine 101) as described herein. The system 100, as illustrated, includes a probe 105 with a catheter 110 (including at least one electrode 111), a shaft 112, a sheath 113, and a manipulator 114. The system 100, as illustrated, also includes a physician 115 (or a medical professional or clinician), a heart 120, a patient 125, and a bed 130 (or a table). Note that insets 140 and 150 show the heart 120 and the catheter 110 in greater detail. The system 100 also, as illustrated, includes a console 160 (including one or more processors 161 and memories 162) and a display 165. Note further each element and/or item of the system 100 is representative of one or more of that element and/or that item. The example of the system 100 shown in FIG. 1 can be modified to implement the embodiments disclosed herein. The disclosed embodiments can similarly be applied using other system components and settings. Additionally, the system 100 can include additional components, such as elements for sensing electrical activity, wired or wireless connectors, processing and display devices, or the like.

The system 100 can be utilized to detect, diagnose, and/or treat cardiac conditions (e.g., using the determination engine 101). Cardiac conditions, such as cardiac arrhythmias, persist as common and dangerous medical ailments, especially in the aging population. For instance, the system 100 can be part of a surgical system (e.g., CARTO® system sold by Biosense Webster) that is configured to obtain biometric data (e.g., anatomical and electrical measurements of a patient's organ, such as the heart 120) and perform a cardiac ablation procedure. More particularly, treatments for cardiac conditions such as cardiac arrhythmia often require obtaining a detailed mapping of cardiac tissue, chambers, veins, arteries and/or electrical pathways. For example, a prerequisite for performing a catheter ablation (as described herein) successfully is that the cause of the cardiac arrhythmia is accurately located in a chamber of the heart 120. Such locating may be done via an electrophysiological investigation during which electrical potentials are detected spatially resolved with a mapping catheter (e.g., the catheter 110) introduced into the chamber of the heart 120. This electrophysiological investigation, the so-called electro-anatomical mapping, thus provides 3D mapping data which can be displayed on a monitor. In many cases, the mapping function and a treatment function (e.g., ablation) are provided by a single catheter or group of catheters such that the mapping catheter also operates as a treatment (e.g., ablation) catheter at the same time. In this case, the determination engine 101 can be directly stored and executed by the catheter 110.

In patients (e.g., the patient 125) with normal sinus rhythm (NSR), the heart (e.g., the heart 120), which includes atrial, ventricular, and excitatory conduction tissue, is electrically excited to beat in a synchronous, patterned fashion. Note that this electrical excitement can be detected as intracardiac electrocardiogram (IC ECG) data or the like.

In patients (e.g., the patient 125) with a cardiac arrhythmia (e.g., atrial fibrillation or aFib), abnormal regions of cardiac tissue do not follow a synchronous beating cycle associated with normally conductive tissue, which is in contrast to patients with NSR. Instead, the abnormal regions of cardiac tissue aberrantly conduct to adjacent tissue, thereby disrupting the cardiac cycle into an asynchronous cardiac rhythm. Note that this asynchronous cardiac rhythm can also be detected as the IC ECG data. Such abnormal conduction has been previously known to occur at various regions of the heart 120, for example, in the region of the sino-atrial (SA) node, along the conduction pathways of the atrioventricular (AV) node, or in the cardiac muscle tissue forming the walls of the ventricular and atrial cardiac chambers. There are other conditions, such as flutter, where the pattern of abnormally conducting tissues lead to reentry paths such that the chamber beats in a regular pattern that can be multiple times the sinus rhythm.

In support of the system 100 detecting, diagnosing, and/or treating cardiac conditions, the probe 105 can be navigated by the physician 115 into the heart 120 of the patient 125 lying on the bed 130. For instance, the physician 115 can insert the shaft 112 through the sheath 113, while manipulating a distal end of the shaft 112 using the manipulator 114 near the proximal end of the catheter 110 and/or deflection from the sheath 113. As shown in an inset 140, the catheter 110 can be fitted at the distal end of the shaft 112. The catheter 110 can be inserted through the sheath 113 in a collapsed state and can be then expanded within the heart 120.

Generally, electrical activity at a point in the heart 120 may be typically measured by advancing the catheter 110 containing an electrical sensor at or near its distal tip (e.g., the at least one electrode 111) to that point in the heart 120, contacting the tissue with the sensor and acquiring data at that point. One drawback with mapping a cardiac chamber using a catheter type containing only a single, distal tip electrode is the long period of time required to accumulate data on a point-by-point basis over the requisite number of points required for a detailed map of the chamber as a whole. Accordingly, multiple-electrode catheters (e.g., the catheter 110) have been developed to simultaneously measure electrical activity at multiple points in the heart chamber.

The catheter 110, which can include the at least one electrode 111 and a catheter needle coupled onto a body thereof, can be configured to obtain biometric data, such as electrical signals of an intra-body organ (e.g., the heart 120), and/or to ablate tissue areas of thereof (e.g., a cardiac chamber of the heart 120). Note that the electrodes 111 are representative of any like elements, such as tracking coils, piezoelectric transducer, electrodes, or combination of elements configured to ablate the tissue areas or to obtain the biometric data. According to one or more embodiments, the catheter 110 can include one or more position sensors that used are to determine trajectory information. The trajectory information can be used to infer motion characteristics, such as the contractility of the tissue.

Biometric data (e.g., patient biometrics, patient data, or patient biometric data) can include one or more of local activation times (LATs), electrical activity, topology, bipolar mapping, reference activity, ventricle activity, dominant frequency, impedance, or the like. The LAT can be a point in time of a threshold activity corresponding to a local activation, calculated based on a normalized initial starting point. Electrical activity can be any applicable electrical signals that can be measured based on one or more thresholds and can be sensed and/or augmented based on signal to noise ratios and/or other filters. A topology can correspond to the physical structure of a body part or a portion of a body part and can correspond to changes in the physical structure relative to different parts of the body part or relative to different body parts. A dominant frequency can be a frequency or a range of frequency that is prevalent at a portion of a body part and can be different in different portions of the same body part. For example, the dominant frequency of a PV of a heart can be different than the dominant frequency of the right atrium of the same heart. Impedance can be the resistance measurement at a given area of a body part.

Examples of biometric data include, but are not limited to, patient identification data, IC ECG data, bipolar intracardiac reference signals, anatomical and electrical measurements, trajectory information, body surface (BS) ECG data, historical data, brain biometrics, blood pressure data, ultrasound signals, radio signals, audio signals, a two- or three-dimensional image data, blood glucose data, and temperature data. The biometrics data can be used, generally, to monitor, diagnosis, and treatment any number of various diseases, such as cardiovascular diseases (e.g., arrhythmias, cardiomyopathy, and coronary artery disease) and autoimmune diseases (e.g., type I and type II diabetes). Note that BS ECG data can include data and signals collected from electrodes on a surface of a patient, IC ECG data can include data and signals collected from electrodes within the patient, and ablation data can include data and signals collected from tissue that has been ablated. Further, BS ECG data, IC ECG data, and ablation data, along with catheter electrode position data, can be derived from one or more procedure recordings.

For example, the catheter 110 can use the electrodes 111 to implement intravascular ultrasound and/or MRI catheterization to image the heart 120 (e.g., obtain and process the biometric data). Inset 150 shows the catheter 110 in an enlarged view, inside a cardiac chamber of the heart 120. Although the catheter 110 is shown to be a point catheter, it will be understood that any shape that includes one or more electrodes 111 can be used to implement the exemplary embodiments disclosed herein.

Examples of the catheter 106 include, but are not limited to, a linear catheter with multiple electrodes, a balloon catheter including electrodes dispersed on multiple spines that shape the balloon, a lasso or loop catheter with multiple electrodes, or any other applicable shape. Linear catheters can be fully or partially elastic such that it can twist, bend, and or otherwise change its shape based on received signal and/or based on application of an external force (e.g., cardiac tissue) on the linear catheter. The balloon catheter can be designed such that when deployed into a patient's body, its electrodes can be held in intimate contact against an endocardial surface. As an example, a balloon catheter can be inserted into a lumen, such as a pulmonary vein (PV). The balloon catheter can be inserted into the PV in a deflated state, such that the balloon catheter does not occupy its maximum volume while being inserted into the PV. The balloon catheter can expand while inside the PV, such that those electrodes on the balloon catheter are in contact with an entire circular section of the PV. Such contact with an entire circular section of the PV, or any other lumen, can enable efficient imaging and/or ablation.

According to other examples, body patches and/or body surface electrodes may also be positioned on or proximate to a body of the patient 125. The catheter 110 with the one or more electrodes 111 can be positioned within the body (e.g., within the heart 120) and a position of the catheter 110 can be determined by the 100 system based on signals transmitted and received between the one or more electrodes 111 of the catheter 110 and the body patches and/or body surface electrodes. Additionally, the electrodes 111 can sense the biometric data from within the body of the patient 125, such as within the heart 120 (e.g., the electrodes 111 sense the electrical potential of the tissue in real time). The biometric data can be associated with the determined position of the catheter 110 such that a rendering of the patient's body part (e.g., the heart 120) can be displayed and show the biometric data overlaid on a shape of the body part.

The probe 105 and other items of the system 100 can be connected to the console 160. The console 160 can include any computing device, which employs the machine learning and/or an artificial intelligence algorithm (represented as the determination engine 101). According to an exemplary embodiment, the console 160 includes the one or more processors 161 (any computing hardware) and the memory 162 (any non-transitory tangible media), where the one or more processors 161 execute computer instructions with respect the determination engine 101 and the memory 162 stores these instructions for execution by the one or more processors 161. For instance, the console 160 can be configured to receive and process the biometric data and determine if a given tissue area conducts electricity. In some embodiments, the console 160 can be further programmed by the determination engine 101 (in software) to carry out the functions of determining stability information with respect to movement of a catheter, receiving electrical signals captured by the catheter in correlation to the stability information, and assigning a position in space to the electrical signals based on the stability information. According to one or more embodiments, the determination engine 101 can be external to the console 160 and can be located, for example, in the catheter 110, in an external device, in a mobile device, in a cloud-based device, or can be a stand-alone processor. In this regard, the determination engine 101 can be transferable/downloaded in electronic form, over a network.

In an example, the console 160 can be any computing device, as noted herein, including software (e.g., the determination engine 101) and/or hardware (e.g., the processor 161 and the memory 162), such as a general-purpose computer, with suitable front end and interface circuits for transmitting and receiving signals to and from the probe 105, as well as for controlling the other components of the system 100. For example, the front end and interface circuits include input/output (I/O) communication interfaces that enables the console 160 to receive signals from and/or transfer signals to the at least one electrode 111. The console 160 can include real-time noise reduction circuitry typically configured as a field programmable gate array (FPGA), followed by an analog-to-digital (A/D) ECG or electrocardiograph/electromyogram (EMG) signal conversion integrated circuit. The console 160 can pass the signal from an A/D ECG or EMG circuit to another processor and/or can be programmed to perform one or more functions disclosed herein.

The display 165, which can be any electronic device for the visual presentation of the biometric data, is connected to the console 160. According to an exemplary embodiment, during a procedure, the console 160 can facilitate on the display 165 a presentation of a body part rendering to the physician 115 and store data representing the body part rendering in the memory 162. For instance, maps depicting motion characteristics can be rendered/constructed based on the trajectory information sampled at a sufficient number of points in the heart 120. As an example, the display 165 can include a touchscreen that can be configured to accept inputs from the medical professional 115, in addition to presenting the body part rendering.

In some embodiments, the physician 115 can manipulate the elements of the system 100 and/or the body part rendering using one or more input devices, such as a touch pad, a mouse, a keyboard, a gesture recognition apparatus, or the like. For example, an input device can be used to change a position of the catheter 110, such that rendering is updated. Note that the display 165 can be located at a same location or a remote location, such as a separate hospital or in separate healthcare provider networks.

According to one or more embodiments, the system 100 can also obtain the biometric data using ultrasound, computed tomography (CT), MRI, or other medical imaging techniques utilizing the catheter 110 or other medical equipment. For instance, the system 100 can obtain ECG data and/or anatomical and electrical measurements of the heart 120 (e.g., the biometric data) using one or more catheters 110 or other sensors. More particularly, the console 160 can be connected, by a cable, to BS electrodes, which include adhesive skin patches affixed to the patient 125. The BS electrodes can procure/generate the biometric data in the form of the BS ECG data. For instance, the processor 161 can determine position coordinates of the catheter 110 inside the body part (e.g., the heart 120) of the patient 125. The position coordinates may be based on impedances or electromagnetic fields measured between the body surface electrodes and the electrode 111 of the catheter 110 or other electromagnetic components. Additionally, or alternatively, location pads, which generate magnetic fields used for navigation, may be located on a surface of the bed 130 and may be separate from the bed 130. The biometric data can be transmitted to the console 160 and stored in the memory 162. Alternatively, or in addition, the biometric data may be transmitted to a server, which may be local or remote, using a network as further described herein.

According to one or more exemplary embodiments, the catheter 110 may be configured to ablate tissue areas of a cardiac chamber of the heart 120. Inset 150 shows the catheter 110 in an enlarged view, inside a cardiac chamber of the heart 120. For instance, ablation electrodes, such as the at least one electrode 111, may be configured to provide energy to tissue areas of an intra-body organ (e.g., the heart 120). The energy may be thermal energy and may cause damage to the tissue area starting from the surface of the tissue area and extending into the thickness of the tissue area. The biometric data with respect to ablation procedures (e.g., ablation tissues, ablation locations, etc.) can be considered ablation data.

According to an example, with respect to obtaining the biometric data, a multi-electrode catheter (e.g., the catheter 110) can be advanced into a chamber of the heart 120. Anteroposterior (AP) and lateral fluorograms can be obtained to establish the position and orientation of each of the electrodes. ECGs can be recorded from each of the electrodes 111 in contact with a cardiac surface relative to a temporal reference, such as the onset of the P-wave in sinus rhythm from a BS ECG and/or signals from electrodes 111 of the catheter 110 placed in the coronary sinus. The system, as further disclosed herein, may differentiate between those electrodes that register electrical activity and those that do not due to absence of close proximity to the endocardial wall. After initial ECGs are recorded, the catheter may be repositioned, and fluorograms and ECGs may be recorded again. An electrical map (e.g., via cardiac mapping) can then be constructed from iterations of the process above.

Cardiac mapping can be implemented using one or more techniques. Generally, mapping of cardiac areas such as cardiac regions, tissue, veins, arteries and/or electrical pathways of the heart 120 may result in identifying problem areas such as scar tissue, arrhythmia sources (e.g., electric rotors), healthy areas, and the like. Cardiac areas may be mapped such that a visual rendering of the mapped cardiac areas is provided using a display, as further disclosed herein. Additionally, cardiac mapping (which is an example of heart imaging) may include mapping based on one or more modalities such as, but not limited to LAT, local activation velocity, an electrical activity, a topology, a bipolar mapping, a dominant frequency, or an impedance. Data (e.g., biometric data) corresponding to multiple modalities may be captured using a catheter (e.g., the catheter 110) inserted into a patient's body and may be provided for rendering at the same time or at different times based on corresponding settings and/or preferences of the physician 115.

As an example of a first technique, cardiac mapping may be implemented by sensing an electrical property of heart tissue, for example, LAT, as a function of the precise location within the heart 120. The corresponding data (e.g., biometric data) may be acquired with one or more catheters (e.g., the catheter 110) that are advanced into the heart 1120 and that have electrical and location sensors (e.g., the electrodes 111) in their distal tips. As specific examples, location and electrical activity may be initially measured on about 10 to about 20 points on the interior surface of the heart 120. These data points may be generally sufficient to generate a preliminary reconstruction or map of the cardiac surface to a satisfactory quality. The preliminary map may be combined with data taken at additional points to generate a more comprehensive map of the heart's electrical activity. In clinical settings, it is not uncommon to accumulate data at 100 or more sites (e.g., several thousand) to generate a detailed, comprehensive map of heart chamber electrical activity. The generated detailed map may then serve as the basis for deciding on a therapeutic course of action, for example, tissue ablation as described herein, to alter the propagation of the heart's electrical activity and to restore normal heart rhythm.

Further, cardiac mapping can be generated based on detection of intracardiac electrical potential fields (e.g., which is an example of IC ECG data and/or bipolar intracardiac reference signals). A non-contact technique to simultaneously acquire a large amount of cardiac electrical information may be implemented. For example, a catheter type having a distal end portion may be provided with a series of sensor electrodes distributed over its surface and connected to insulated electrical conductors for connection to signal sensing and processing means. The size and shape of the end portion may be such that the electrodes are spaced substantially away from the wall of the cardiac chamber. Intracardiac potential fields may be detected during a single cardiac beat. According to an example, the sensor electrodes may be distributed on a series of circumferences lying in planes spaced from each other. These planes may be perpendicular to the major axis of the end portion of the catheter. At least two additional electrodes may be provided adjacent at the ends of the major axis of the end portion. As a more specific example, the catheter may include four circumferences with eight electrodes spaced equiangularly on each circumference. Accordingly, in this specific implementation, the catheter may include at least 34 electrodes (32 circumferential and 2 end electrodes). As another more specific example, the catheter may include other multi-spline catheters, such as five soft flexible branches, eight radial splines, or a parallel splined pancake turner type (e.g., any of which may have a total of 42 electrodes).

As example of electrical or cardiac mapping, an electrophysiological cardiac mapping system and technique based on a non-contact and non-expanded multi-electrode catheter (e.g., the catheter 110) can be implemented. ECGs may be obtained with one or more catheters 110 having multiple electrodes (e.g., such as between 42 to 122 electrodes). According to this implementation, knowledge of the relative geometry of the probe and the endocardium can be obtained by an independent imaging modality, such as transesophageal echocardiography. After the independent imaging, non-contact electrodes may be used to measure cardiac surface potentials and construct maps therefrom (e.g., in some cases using bipolar intracardiac reference signals). This technique can include the following steps (after the independent imaging step): (a) measuring electrical potentials with a plurality of electrodes disposed on a probe positioned in the heart 120; (b) determining the geometric relationship of the probe surface and the endocardial surface and/or other reference; (c) generating a matrix of coefficients representing the geometric relationship of the probe surface and the endocardial surface; and (d) determining endocardial potentials based on the electrode potentials and the matrix of coefficients.

As another example of electrical or cardiac mapping, a technique and apparatus for mapping the electrical potential distribution of a heart chamber can be implemented. An intra-cardiac multi-electrode mapping catheter assembly can be inserted into the heart 120. The mapping catheter (e.g., the catheter 110) assembly can include a multi-electrode array with one or more integral reference electrodes (e.g., one or the electrodes 111) or a companion reference catheter.

According to one or more exemplary embodiments, the electrodes may be deployed in the form of a substantially spherical array, which may be spatially referenced to a point on the endocardial surface by the reference electrode or by the reference catheter this is brought into contact with the endocardial surface. The preferred electrode array catheter may carry a number of individual electrode sites (e.g., at least 24). Additionally, this example technique may be implemented with knowledge of the location of each of the electrode sites on the array, as well as knowledge of the cardiac geometry. These locations are preferably determined by a technique of impedance plethysmography.

In view of electrical or cardiac mapping and according to another example, the catheter 110 can be a heart mapping catheter assembly that may include an electrode array defining a number of electrode sites. The heart mapping catheter assembly can also include a lumen to accept a reference catheter having a distal tip electrode assembly that may be used to probe the heart wall. The map heart mapping catheter assembly can include a braid of insulated wires (e.g., for instance having x to y wires, such as 24 to 64, wires in the braid), and each of the wires may be used to form electrode sites. The heart mapping catheter assembly may be readily positioned in the heart 120 to be used to acquire electrical activity information from a first set of non-contact electrode sites and/or a second set of in-contact electrode sites.

Further, according to another example, the catheter 110 that can implement mapping electrophysiological activity within the heart can include a distal tip that is adapted for delivery of a stimulating pulse for pacing the heart or an ablative electrode for ablating tissue in contact with the tip. This catheter 110 can further include at least one pair of orthogonal electrodes to generate a difference signal indicative of the local cardiac electrical activity adjacent the orthogonal electrodes.

As noted herein, the system 100 can be utilized to detect, diagnose, and/or treat cardiac conditions. In example operation, a process for measuring electrophysiologic data in a heart chamber may be implemented by the system 100. The process may include, in part, positioning a set of active and passive electrodes into the heart 120, supplying current to the active electrodes, thereby generating an electric field in the heart chamber, and measuring the electric field at the passive electrode sites. The passive electrodes are contained in an array positioned on an inflatable balloon of a balloon catheter. In preferred embodiments, the array is said to have from x to y, such as 60 to 64, electrodes.

As another example operation, cardiac mapping may be implemented by the system 100 using one or more ultrasound transducers. The ultrasound transducers may be inserted into a patient's heart 120 and may collect a plurality of ultrasound slices (e.g., two dimensional or three-dimensional slices) at various locations and orientations within the heart 120. The location and orientation of a given ultrasound transducer may be known and the collected ultrasound slices may be stored such that they can be displayed at a later time. One or more ultrasound slices corresponding to the position of the probe 105 (e.g., a treatment catheter shown as catheter 110) at the later time may be displayed and the probe 105 may be overlaid onto the one or more ultrasound slices.

In view of the system 100, it is noted that cardiac arrhythmias, including atrial arrhythmias, may be of a multiwavelet reentrant type, characterized by multiple asynchronous loops of electrical impulses that are scattered about the atrial chamber and are often self-propagating (e.g., another example of the IC ECG data). Alternatively, or in addition to the multiwavelet reentrant type, cardiac arrhythmias may also have a focal origin, such as when an isolated region of tissue in an atrium fires autonomously in a rapid, repetitive fashion (e.g., another example of the IC ECG data). Ventricular tachycardia (V-tach or VT) is a tachycardia, or fast heart rhythm that originates in one of the ventricles of the heart. This is a potentially life-threatening arrhythmia because it may lead to ventricular fibrillation and sudden death.

For example, aFib may occur when the normal electrical impulses (e.g., another example of the IC ECG data) generated by the sinoatrial node are overwhelmed by disorganized electrical impulses (e.g., signal interference) that originate in the atria veins and PVs causing irregular impulses to be conducted to the ventricles. An irregular heartbeat results and may last from minutes to weeks, or even years. aFib is often a chronic condition that leads to a small increase in the risk of death often due to strokes. A line of treatment for aFib is medication that either slows the heart rate or revert the heart rhythm back to normal. Additionally, persons with aFib are often given anticoagulants to protect them from the risk of stroke. The use of such anticoagulants comes with its own risk of internal bleeding. In some patients, medication is not sufficient and their aFib is deemed to be drug-refractory, i.e., untreatable with standard pharmacological interventions. Synchronized electrical cardioversion may also be used to convert aFib to a normal heart rhythm. Alternatively, aFib patients are treated by catheter ablation.

A catheter ablation-based treatment may include mapping the electrical properties of heart tissue, especially the endocardium and the heart volume, and selectively ablating cardiac tissue by application of energy. Electrical or cardiac mapping (e.g., implemented by any electrophysiological cardiac mapping system and technique described herein) includes creating a map of electrical potentials (e.g., a voltage map) of the wave propagation along the heart tissue or a map of arrival times (e.g., a LAT map) to various tissue located points. Electrical or cardiac mapping (e.g., a cardiac map) may be used for detecting local heart tissue dysfunction. Ablations, such as those based on cardiac mapping, can cease or modify the propagation of unwanted electrical signals from one portion of the heart 120 to another.

The ablation process damages the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. Another example of an energy delivery technique includes irreversible electroporation (IRE), which provides high electric fields that damage cell membranes. In a two-step procedure (e.g., mapping followed by ablation) electrical activity at points within the heart 120 is typically sensed and measured by advancing the catheter 110 containing one or more electrical sensors (e.g., electrodes 111) into the heart 120 and obtaining/acquiring data at a multiplicity of points (e.g., as biometric data generally, or as ECG data specifically). This ECG data is then utilized to select the endocardial target areas, at which ablation is to be performed.

Cardiac ablation and other cardiac electrophysiological procedures have become increasingly complex as clinicians treat challenging conditions such as atrial fibrillation and ventricular tachycardia. The treatment of complex arrhythmias can now rely on the use of three-dimensional (3D) mapping systems to reconstruct the anatomy of the heart chamber of interest. In this regard, the determination engine 101 employed by the system 100 herein manipulates and evaluates the biometric data generally, or the ECG data specifically, to produce improved tissue data that enables more accurate diagnosis, images, scans, and/or maps for treating an abnormal heartbeat or arrhythmia. For example, cardiologists rely upon software, such as the Complex Fractionated Atrial Electrograms (CFAE) module of the CARTO® 3 3D mapping system, produced by Biosense Webster, Inc. (Diamond Bar, Calif.), to generate and analyze ECG data. The determination engine 101 of the system 100 enhances this software to generate and analyze the improved biometric data, which further provide multiple pieces of information regarding electrophysiological properties of the heart 120 (including the scar tissue) that represent cardiac substrates (anatomical and functional) of aFib.

Accordingly, the system 100 can implement a 3D mapping system, such as CARTO® 3 3D mapping system, to localize the potential arrhythmogenic substrate of the cardiomyopathy in terms of abnormal ECG detection. The substrate linked to these cardiac conditions is related to the presence of fragmented and prolonged ECGs in the endocardial and/or epicardial layers of the ventricular chambers (right and left). In general, abnormal tissue is characterized by low-voltage ECGs. However, initial clinical experience in endo-epicardial mapping indicates that areas of low-voltage are not always present as the sole arrhythmogenic mechanism in such patients. In fact, areas of low or medium voltage may exhibit ECG fragmentation and prolonged activities during sinus rhythm, which corresponds to the critical isthmus identified during sustained and organized ventricular arrhythmias, e.g., applies only to non-tolerated ventricular tachycardias. Moreover, in many cases, ECG fragmentation and prolonged activities are observed in the regions showing a normal or near-normal voltage amplitude (>1-1.5 mV). Although the latter areas may be evaluated according to the voltage amplitude, they cannot be considered as normal according to the intracardiac signal, thus representing a true arrhythmogenic substrate. The 3D mapping may be able to localize the arrhythmogenic substrate on the endocardial and/or epicardial layer of the right/left ventricle, which may vary in distribution according to the extension of the main disease.

As another example operation, cardiac mapping may be implemented by the system 100 using one or more multiple-electrode catheters (e.g., the catheter 110). Multiple-electrode catheters are used to stimulate and map electrical activity in the heart 120 and to ablate sites of aberrant electrical activity. In use, the multiple-electrode catheter is inserted into a major vein or artery, e.g., femoral vein, and then guided into the chamber of the heart 120 of concern. A typical ablation procedure involves the insertion of the catheter 110 having at least one electrode 111 at its distal end, into a heart chamber. A reference electrode is provided, taped to the skin of the patient or by means of a second catheter that is positioned in or near the heart or selected from one or the other electrodes 111 of the catheter 110. Radio frequency (RF) current is applied to a tip electrode 111 of the ablating catheter 110, and current flows through the media that surrounds it (e.g., blood and tissue) toward the reference electrode. The distribution of current depends on the amount of electrode surface in contact with the tissue as compared to blood, which has a higher conductivity than the tissue. Heating of the tissue may occur due to its electrical resistance. The tissue is heated sufficiently to cause cellular destruction in the cardiac tissue resulting in formation of a lesion within the cardiac tissue which is electrically non-conductive. During this process, heating of the tip electrode 111 also may occur as a result of conduction from the heated tissue to the electrode itself. If the electrode temperature becomes sufficiently high, possibly above 60 degrees Celsius, a thin transparent coating of dehydrated blood protein can form on the surface of the electrode 111. If the temperature continues to rise, this dehydrated layer can become progressively thicker resulting in blood coagulation on the electrode surface. Because dehydrated biological material has a higher electrical resistance than endocardial tissue, impedance to the flow of electrical energy into the tissue also increases. If the impedance increases sufficiently, an impedance rise may occur, and the catheter 110 must be removed from the body and the tip electrode 111 cleaned.

Figure 2:
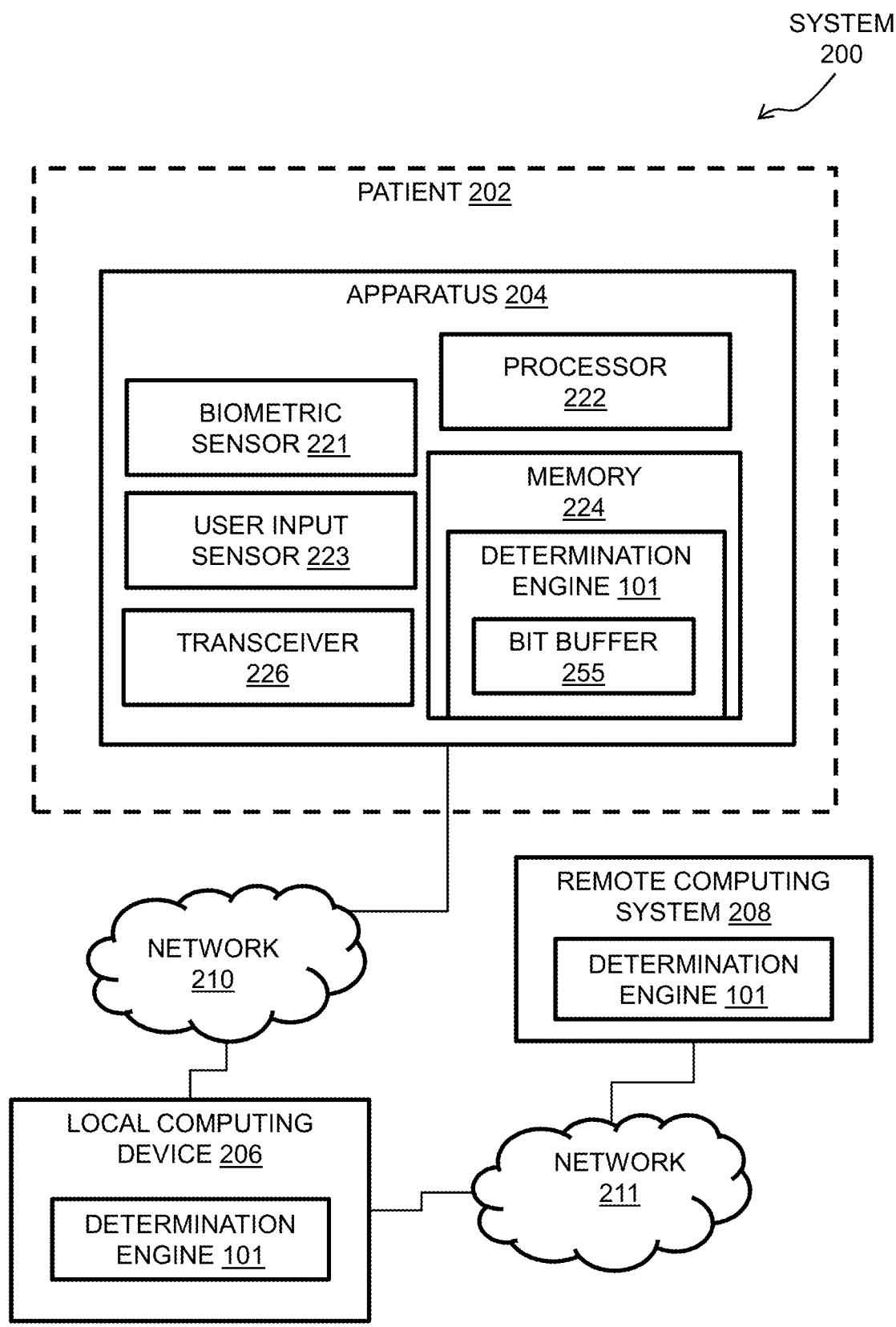
FIG. 2 illustrates a block diagram of an example system for automatic catheter stability determination according to one or more embodiments.

Turning now to FIG. 2, a diagram of a system 200 in which one or more features of the disclosure subject matter can be implemented is illustrated according to one or more exemplary embodiments. The system 200, in general, provides an automatic catheter stability determination. The system 200 includes, in relation to a patient 202 (e.g., an example of the patient 125 of FIG. 1), an apparatus 204, a local computing device 206, a remote computing system 208, a first network 210, and a second network 211. Further, the apparatus 204 can include a biometric sensor 221 (e.g., an example of the catheter 110 of FIG. 1), a processor 222, a user input (UI) sensor 223, a memory 224, and a transceiver 226. Note that the determination engine 101 of FIG. 1 is reused in FIG. 2 for ease of explanation and brevity.

According to an embodiment, the apparatus 204 can be an example of the system 100 of FIG. 1, where the apparatus 204 can include both components that are internal to the patient and components that are external to the patient. According to another embodiment, the apparatus 204 can be an apparatus that is external to the patient 202 that includes an attachable patch (e.g., that attaches to a patient's skin). According to another embodiment, the apparatus 204 can be internal to a body of the patient 202 (e.g., subcutaneously implantable), where the apparatus 204 can be inserted into the patient 202 via any applicable manner including orally injecting, surgical insertion via a vein or artery, an endoscopic procedure, or a lap aroscopic procedure. According to an embodiment, while a single apparatus 204 is shown in FIG. 2, example systems may include a plurality of apparatuses.

Accordingly, the apparatus 204, the local computing device 206, and/or the remote computing system 208 can be programed to execute computer instructions with respect the determination engine 101. As an example, the memory 224 stores these instructions for execution by the processor 222 so that the apparatus 204 can receive and process the biometric data via the biometric sensor 201. In this way, the processor 222 and the memory 224 are representative of processors and memories of the local computing device 206 and/or the remote computing system 208.

The apparatus 204, local computing device 206, and/or the remote computing system 208 can be any combination of software and/or hardware that individually or collectively store, execute, and implement the determination engine 101 and functions thereof. Further, the apparatus 204, local computing device 206, and/or the remote computing system 208 can be an electronic, computer framework comprising and/or employing any number and combination of computing device and networks utilizing various communication technologies, as described herein. The apparatus 204, local computing device 206, and/or the remote computing system 208 can be easily scalable, extensible, and modular, with the ability to change to different services or reconfigure some features independently of others.

The networks 210 and 211 can be a wired network, a wireless network, or include one or more wired and wireless networks. According to an embodiment, the network 210 is an example of a short-range network (e.g., local area network (LAN), or personal area network (PAN)). Information can be sent, via the network 210, between the apparatus 204 and the local computing device 206 using any one of various short-range wireless communication protocols, such as Bluetooth, Wi-Fi, Zigbee, Z-Wave, near field communications (NFC), ultra-band, Zigbee, or infrared (IR). Further, the network 211 is an example of one or more of an Intranet, a local area network (LAN), a wide area network (WAN), a metropolitan area network (MAN), a direct connection or series of connections, a cellular telephone network, or any other network or medium capable of facilitating communication between the local computing device 206 and the remote computing system 208. Information can be sent, via the network 211, using any one of various long-range wireless communication protocols (e.g., TCP/IP, HTTP, 3G, 4G/LTE, or 5G/New Radio). Note that for either network 210 and 211 wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

In operation, the apparatus 204 can continually or periodically obtain, monitor, store, process, and communicate via network 210 the biometric data associated with the patient 202. Further, the apparatus 204, local computing device 206, and/the remote computing system 208 are in communication through the networks 210 and 211 (e.g., the local computing device 206 can be configured as a gateway between the apparatus 204 and the remote computing system 208). For instance, the apparatus 204 can be an example of the system 100 of FIG. 1 configured to communicate with the local computing device 206 via the network 210. The local computing device 206 can be, for example, a stationary/standalone device, a base station, a desktop/laptop computer, a smart phone, a smartwatch, a tablet, or other device configured to communicate with other devices via networks 211 and 210. The remote computing system 208, implemented as a physical server on or connected to the network 211 or as a virtual server in a public cloud computing provider (e.g., Amazon Web Services (AWS)®) of the network 211, can be configured to communicate with the local computing device 206 via the network 211. Thus, the biometric data associated with the patient 202 can be communicated throughout the system 200.

Elements of the apparatus 224 are now described. The biometric sensor 221 may include, for example, one or more transducers configured to convert one or more environmental conditions into an electrical signal, such that different types of biometric data are observed/obtained/acquired. For example, the biometric sensor 221 can include one or more of an electrode (e.g., the electrode 111 of FIG. 1), a temperature sensor (e.g., thermocouple), a blood pressure sensor, a blood glucose sensor, a blood oxygen sensor, a pH sensor, an accelerometer, and a microphone.

The processor 222, in executing the determination engine 101, can be configured to receive, process, and manage the biometric data acquired by the biometric sensor 221, and communicate the biometric data to the memory 224 for storage and/or across the network 210 via the transceiver 226. Biometric data from one or more other apparatuses 204 can also be received by the processor 222 through the transceiver 226. Also, as described in more detail herein, the processor 222 may be configured to respond selectively to different tapping patterns (e.g., a single tap or a double tap) received from the UI sensor 223, such that different tasks of a patch (e.g., acquisition, storing, or transmission of data) can be activated based on the detected pattern. In some embodiments, the processor 222 can generate audible feedback with respect to detecting a gesture.

The UI sensor 223 includes, for example, a piezoelectric sensor or a capacitive sensor configured to receive a user input, such as a tapping or touching. For example, the UI sensor 223 can be controlled to implement a capacitive coupling, in response to tapping or touching a surface of the apparatus 204 by the patient 202. Gesture recognition may be implemented via any one of various capacitive types, such as resistive capacitive, surface capacitive, projected capacitive, surface acoustic wave, piezoelectric and infrared touching. Capacitive sensors may be disposed at a small area or over a length of the surface, such that the tapping or touching of the surface activates the monitoring device.

The memory 224 is any non-transitory tangible media, such as magnetic, optical, or electronic memory (e.g., any suitable volatile and/or non-volatile memory, such as random-access memory or a hard disk drive). The memory 224 stores the computer instructions for execution by the processor 222. As shown in FIG. 2, the memory 224 can include a bit buffer 255. The bit buffer 255 can be a physical and/or logical reservation of space in the memory 224 for storing stability information and the like (e.g., the electrical signals and the stability information).

The transceiver 226 may include a separate transmitter and a separate receiver. Alternatively, the transceiver 226 may include a transmitter and receiver integrated into a single device.

In operation, the apparatus 204, utilizing the determination engine 101, observes/obtains the biometric data of the patient 202 via the biometric sensor 221, stores the biometric data in the memory, and shares this biometric data across the system 200 via the transceiver 226. The determination engine 101 can then utilize models, neural networks, machine learning, and/or artificial intelligence to provide automatic catheter stability determination. For example, the determination engine 101 stores electrical signals detected by a catheter in correlation to specific locations in the bit buffer 255 based on catheter stability (e.g., a determination that the catheter is at a given location for a time period)

Figure 3:
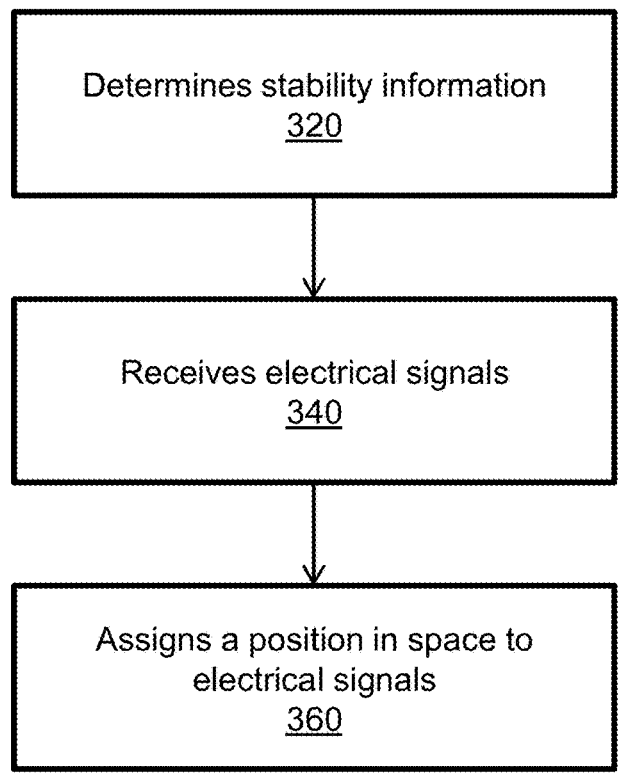
FIG. 3 illustrates an exemplary method according to one or more embodiments.

Turning now to FIG. 3, a method 300 (e.g., performed by the determination engine 101 of FIG. 1 and/or of FIG. 2) is illustrated according to one or more exemplary embodiments.

The method begins at block 320, where the determination engine 101 determines stability information. In an embodiment, the determination engine 101 determines the stability information by using/taking information of the system 100. This information may include catheter/electrode/sensor location data (e.g., comparison data between the catheter 110 and a BS electrode, along with other biometric data), catheter movement data (e.g., accelerometer data), and/or other inputs. For example, x, y, z position coordinates of the catheter 110 within anatomical structure with respect to time (or over time) received/acquired by the determination engine 101. In turn, the determination engine 101 uses any variations of x, y, z position coordinates with respect to time to determine changes in the catheter 110 location and movement and, further, to decide if the catheter 110 is stable within a degree.

According to one or more embodiments, the determination engine 101 uses at least two metrics to determine stability. A first metric is a movement degree, which can be defined by a movement amount (e.g., in millimeters or the like) that is beyond an acceptable value. In this way minor movements within/under the acceptable value can be ignored, such as minor vibrations, anatomical flexing due to breathing, or the like. A second metric is a time degree, which is defined by a time amount that the catheter 110 remains within the movement degree. The combination of the movement degree and the time degree are used by the determination engine 101 to identify whether the catheter 110 has been in a given location for a period of time. The time degree can be a time duration or a predefined time threshold, such as 5 milliseconds, 10 milliseconds, 1 second, 5 seconds, and the like.

According to one or more embodiments, a Boolean operator, when in a first state, identifies that the catheter is stable and that, when in a second state, identifies that the catheter is not stable. More particularly, when the catheter 110 moves (beyond the movement degree) or as the catheter 110 continues to move, the Boolean operator enters the second state or remains in the second state. If the catheter 110 stops moving (is within the movement degree) and remains where it has stopped for longer than the time period (the time degree), the Boolean operator goes to the first state from the second state.

Figure 4:
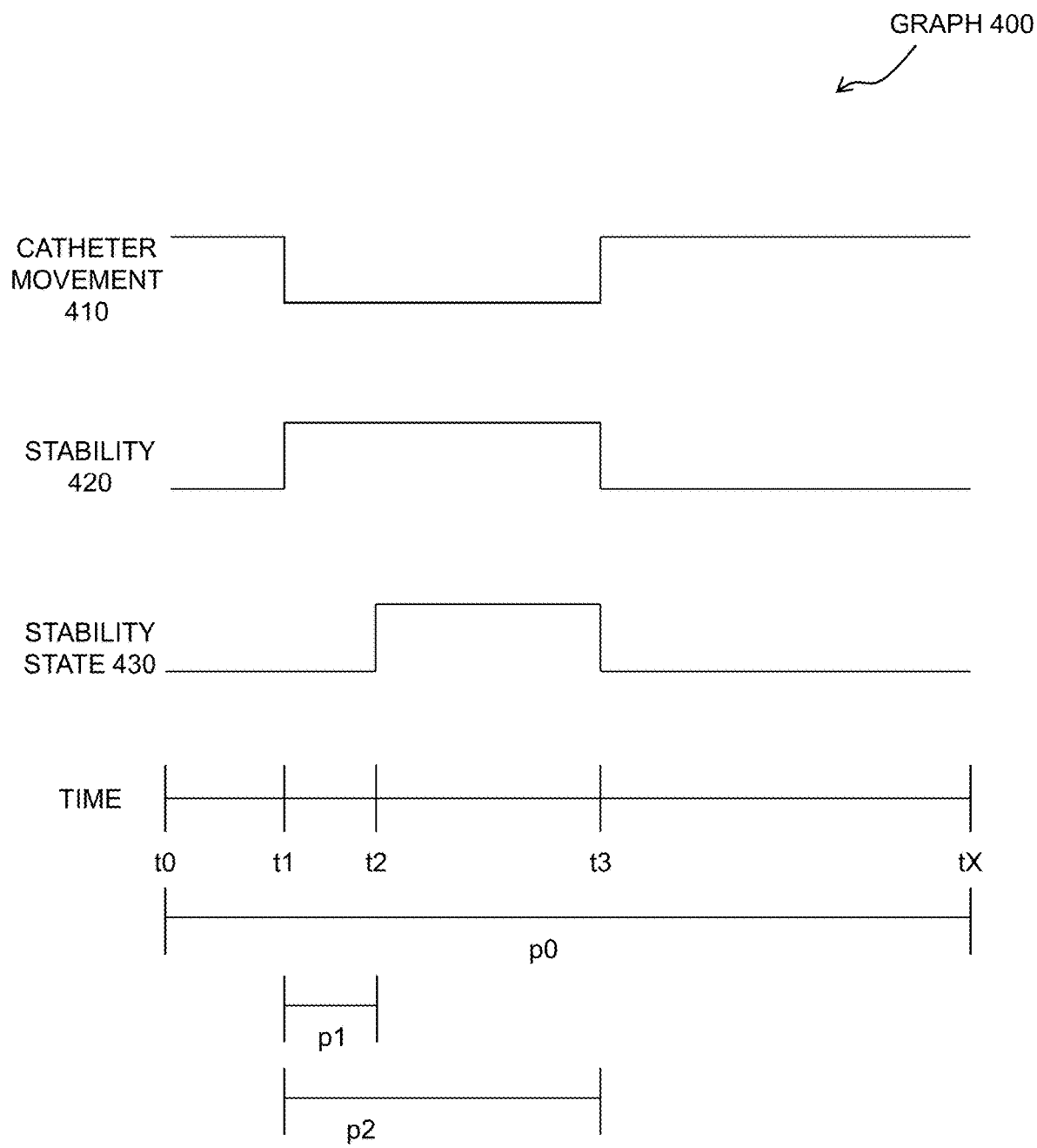
FIG. 4 illustrates an exemplary graph according to one or more embodiments.

As shown in FIG. 4, which illustrates an exemplary graph 400 according to one or more embodiments, the catheter 110 may determine stability continuously, such as along a timeline (e.g., p0) between an initial time (e.g., t0) and a final time (e.g., tX). During this timeline, the catheter 110 may or may not move as shown by the Catheter Movement line 410, which can reflect the catheter/electrode/sensor location data and/or other inputs. Note that when the Catheter Movement line 410 is high, the catheter 110 is moving (e.g., the catheter/electrode/sensor location data and/or other inputs vary in values beyond the movement degree). Note that when the Catheter Movement line 410 is low, the catheter 110 is not moving (e.g., the catheter/electrode/sensor location data and/or other inputs are static, within the movement degree). In accordance with these movements, as shown by the Stability line 420, stability is tracked such that the Stability line 420 is high when the catheter 110 is not moving (e.g., the catheter/electrode/sensor location data has not changed) and low when the catheter 110 is moving (e.g., the catheter/electrode/sensor location data changes). The Stability line 420 illustrates an example of stability information used to make a stability determination.

Once the catheter 110 is determined to be initially stable, such as at a first time (e.g., t1), the determination engine 101 verifies that the catheter 110 remains stable for a time period (e.g., time degree p1) between the first time and a second time (e.g., t2, where t0<t1<t2 and p1=t2−t1). The time degree p1 can be a predefined time threshold as discussed herein.

Further, the Stability State line 430 transitions from the second state (e.g., low) to the first state (e.g., high) at the conclusion of the time degree p1 at the second time t2. Further, the Stability State line 430 transitions from the first state (e.g., high) to the second state (e.g., low) when the catheter 110 begins to move at a third time (e.g., t3, where t2<t3). This transition by the Stability State line 430 inversely matches the Stability line 420 at t3.

At block 340, the determination engine 101 receives electrical signals captured by the catheter 110. The electrical signals, for example, include electronic signal data at electro-anatomical points, such as electrical activity that can be measured, sensed, and/or augmented as described herein). Note that the catheter 110 can continually capture electrical signals along the timeline p0 of FIG. 4 and that the determination engine 101 continually determines stability in relation the continually captured electrical signals. Thus, the electrical signals are correlated to the stability by the determination engine 101. That is, the electrical signals can be matched together with stability to indicate that the catheter 110 was or was not stable. As shown by FIG. 4, the receipt of the electrical signals over a second time period (e.g., p2) between the first time t1 and the second time t3 will be correlated to a first state.

According to one or more embodiments, electronic signal data (e.g., the electrical signals) collected by the catheter 110 can be received in a bit buffer 255 (e.g., of a memory 162 or the memory 224). For example, the bit buffer 255 can be a coded or calculated location in a memory for initially storing electrical signals and stability. Receiving can include, but is not limited to, providing the electrical signals to a storage repository executing an instance of the determination engine 101 and/or across the network 210 (e.g., to another instance of the determination engine).

At block 360, the determination engine 101 assigns a position in space to the electrical signals based on the stability and saves the electrical signals with respect to the position and the stability. Note that the position in the space includes a location of the catheter 110 at the time the electrical signals were acquired (e.g., position coordinates of the catheter 110 inside the patient 125 based on impedances or electromagnetic fields as described herein). The location can be any spot along a path to examine at least a portion of an anatomical structure. When the stability indicates that the catheter 110 was stable, then the position is determined to be a single location and recorded. When the stability indicates that the catheter 110 was unstable, then the position is determined as moving and recorded. In this regard, the electrical signals, collected in entirety, are saved with respect to the assigned position in the space. In turn, based on the assignment and the stability saved therewith, the determination engine 101 enables data selection, analysis, manipulation and display. For instance, the determination engine 101 provides the saved electrical signals such that any one of the captured signals for a stable location may be selected. The determination engine 101 can then utilize models, neural networks, machine learning, and/or artificial intelligence to analyze and/or manipulate the stable electrical signals, while providing the analysis for display.

Figure 5:
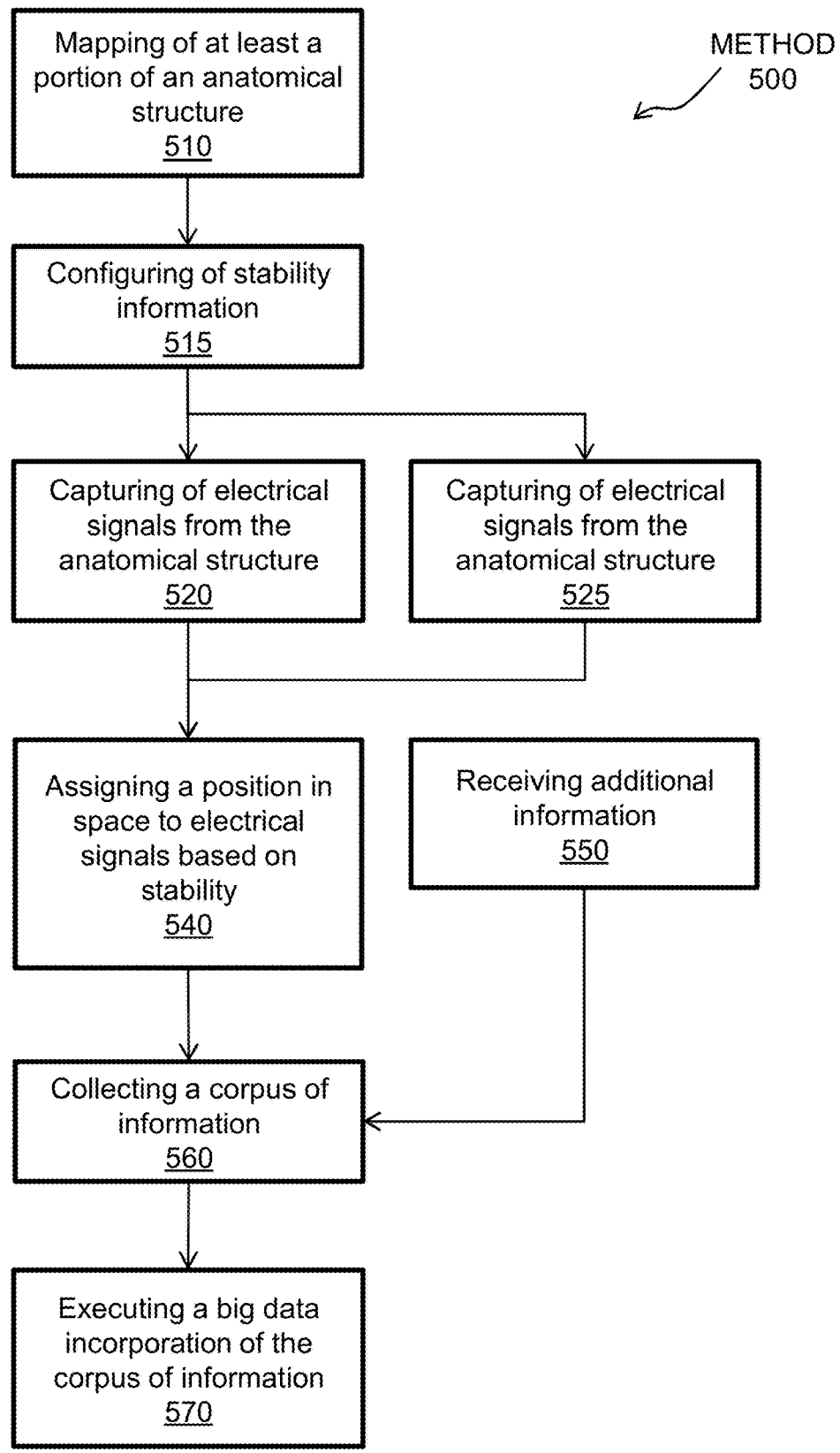
FIG. 5 illustrates an exemplary method according to one or more exemplary embodiments.

Turning now to FIG. 5, a method 500 (e.g., performed by the determination engine 101 of FIG. 1 and/or of FIG. 2) is illustrated according to one or more exemplary embodiments.

The method begins at block 510, where the determination engine 101 begins a mapping procedure of at least a portion of an anatomical structure.

At block 515, stability information is configured (e.g., the movement degree and the time degree). The stability information can be configured based on default values stored within the determination engine 101, can be configured based on analysis of the determination engine 101 (as described herein), and/or can be configured based on a user input (e.g., received before during or after the procedure). The stability information can be configured, in an example, as a high stability, a medium stability, or a low stability, according to mapping procedure need. High stability can include having a relatively low movement degree and/or a relatively short time degree. Low stability can includes having a relatively high movement degree and/or a relatively long time degree. Medium stability can includes having a movement and/or time degrees relatively between the high and low stabilities.

At blocks 520 and 525, the catheter 110 captures/collects electrical signals from the anatomical structure and block 525, while the determination engine determines stability with respect to the electrical signals. The plurality of electrical signals (e.g., a set of electronic signal data) may be collected at different rates by the catheter 110.

In an example, the determination engine 101 determines, based on the electrical signals, a movement of the catheter 110 to a first location (arrival at an initial time) and an amount of time the catheter 110 remained at that first location. In this regard, the determination engine 101 has a plurality of electrical signals from the catheter 110 at the first location. From the plurality of electrical signals, the determination engine 101 can store and use any electrical signal. Note that the catheter 110 and the determination engine repeat these operations at one or more locations to execute the mapping procedure of block 510.

According to one or more embodiments, the electrical signals are recorded from the catheter 110. Recording can include, but is not limited to, storing the electrical signals in the memory 162 or the memory 224 and/or providing for storage the electrical signals to a storage repository and/or across the network 210. Further, the determination engine 101 can store the electrical signals detected by the catheter 110 in the memory 162 or the memory 224 in the bit buffer 255 in correlation to the stability (e.g., state of the Boolean operator).

According to one or more embodiments, electrical signals that are collected while the catheter 110 is indicated as stable can be stored in the bit buffer 255, as well as the electrical signals that are collected while the catheter 110 is indicated as unstable. Note that the stability stored in the bit buffer 255 may be available such that, for a given location, any one of multiple data points may be used for further operations.

For example, if seven signals are collected at a stable time in a first location (e.g., using the time and movement degrees), then these seven signals are are available in the bit buffer 255 for further operations. In some case, the determination engine 101 can use the 7th (latest) electrical signal as the default electrical signal. However, any one of the other 1-6 electrical signals may be selected instead of the 7th signal. According to another embodiment, the determination engine 101 can utilize all seven signals to calculate an average signal.

According to one or more embodiments, the electronic signal data that is collected while the catheter 110 is unstable (e.g., when the Boolean operator is in the second state) can be discarded, such that only the electronic signal data that is collected while the catheter 110 is stable is stored (e.g., while the electrical signals during an unstable catheter state are not recorded). In some cases, all electronic signal data is collected and stored, but then automatically filtered by the determination engine 101 based on the stability (e.g., the determination engine 101 retrospectively applies a filter that retains all electronic signal data that is good for mapping or remapping).

At block 540, the determination engine 101 assigns a position in space to the electrical signals based on the stability. In this regard, collected signal data in its entirety (e.g., the electrical signals) is assigned to the position in the space (e.g., path to examine at least a portion of an anatomical structure) when the Boolean operator is in the first state.

At block 550, the determination engine 101 receives additional information. The additional information can include, but is not limited to, biometric data and/or a training dataset (e.g., one or more of LATs, electrical activity, topology, bipolar mapping, reference activity, ventricle activity, dominant frequency, impedance, or the like).

At block 560, the determination engine 101 collects a corpus of information. The corpus of information includes, but is not limited, stability, movement degrees, time degrees, position information, electrical signals, and additional information as described with respect to block 550. The corpus can be collected across a plurality of cases/procedures, such as over one hundred thousand procedures.

At block 570, the determination engine 101 executes a big data incorporation of the corpus of information. The big data incorporation of the corpus of information includes applying machine learning and/or artificial intelligence to identify patterns related to the stability.

According to one or more embodiments of big data incorporation, the determination engine implements artificial intelligence on the stability to determine patterns related to accuracy and/or consistency of the electrical signals captured by the catheter 110. Regarding consistency patterns, the determination engine 101 executes the big data incorporation of the corpus of information with respect to the mapping procedure of block 510 to determine whether during the electrical signals are found to be consistently stable at one or more locations. Regarding accuracy patterns, the determination engine executes the big data incorporation of the corpus of information with respect to the mapping procedure of block 510 to determine which movement and/or time degrees provide the most accurate electrical signals for each location. Using these patterns, the determination engine can utilize machine learning to adjust the movement and/or time degrees to maintain data consistency and accuracy, without unnecessarily marking data as unstable. That is, if the movement and/or time degrees are set to narrowly, then too many signals may be marked as unstable. Conversely, if the movement and/or time degrees are set to broadly, then too many signals may be marked as stable. In turn, the ability of the determination engine 1010 to determine a stable state of the catheter 110 can be dynamically changed through the big data execution.

One or more advantages, technical effects, and/or benefits include preventing the ignoring or discarding of 'too much' data (e.g., the determination engine 101 using big data analysis can set the movement and/or time degrees so that more or less signals are marked as stable and utilized. For instance, a first pattern may identify that a first location requires a shorter time degree due to a lack of variability in movement in contrast to a second location. In turn, the determination engine 101 can estimate and learn a variety of movement and/or time degrees that produce the best electrical signals and suggest one or more of these movement and/or time degrees to the physician 115. In this way, a user selectable stability level can be generated and suggested by default, which can be further connected to past user experience/input. According to one or more embodiments, the determination engine 101 can determine whether the catheter 110 is faulty or operational based on the accuracy or consistency patterns. If a particular catheter 110 produces electrical signals during a stable period that are not in line with the corpus of information, then the determination engine 101 can notify the physician 115 of the performance concerns or require the catheter 110 be recalibrated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving accuracy in determining a location of a catheter during a medical procedure, the method comprising:

determining, during the medical procedure, catheter stability information with respect to a movement of the catheter, wherein the catheter stability information comprises a movement degree and a time degree and identifies whether the catheter has been in a particular location for a period of time based on the movement degree and time degree, wherein the movement degree comprises an amount of the movement by the catheter respective to a first value, and wherein the time degree comprises an amount of time respective to a second value that the movement degree remains under the first value;

receiving, during the medical procedure, electrical signals captured by the catheter in correlation to the catheter stability information;

determining, during the medical procedure, accuracy and consistency of the electrical signals of the catheter based on the catheter stability information and stability information collected during a plurality of other medical procedures that were performed prior to the medical procedure; and determining, during the medical procedure, the location in space of the catheter based on the accuracy and consistency determined.

2. The method of claim 1, the method further comprising:
saving a portion of the electrical signals captured by the catheter that correspond to when the catheter stability information indicates that the catheter is stable.

3. The method of claim 1, further comprising:
discarding a portion of the electrical signals captured by the catheter that correspond to when the catheter stability information indicates that the catheter is unstable.

4. The method of claim 1, the method further comprising:
determining the movement by the catheter.

5. The method of claim 1, the method further comprising:
acquiring additional information in conjunction with determining the catheter stability information during a real-time procedure.

6. The method of claim 1, the method further comprising:
utilizing a bit buffer to store the electrical signals and the catheter stability information.

7. The method of claim 6, wherein the bit buffer comprises a coded or calculated location in a memory.

8. The method of claim 1, wherein the catheter stability information is configurable based on a user input.

9. The method of claim 1, wherein the first value is a set movement amount, and wherein the second value is a set time duration.

10. The method of claim 1, wherein the catheter stability information is determined for the catheter after time degree increments past the second value.

11. The method of claim 1, the method further comprising:
determining patterns related to the accuracy and the consistency of the electrical signals, and utilizing the patterns to adjust the first and second values.

12. A non-transitory computer readable storage medium storing instructions, the instructions when executed by a processor of a console cause the console to perform the method of claim 1.

13. A system for improving accuracy in determining allocation of a catheter during a medical procedure, the system comprising:

a memory; and one or more processors coupled to the memory, wherein the one or more processors are collectively configured to:

determine, during the medical procedure, catheter stability information with respect to a movement of the catheter, wherein the catheter stability information comprises a movement degree and a time degree and identifies whether the catheter has been in a location for a period of time based on the movement degree and time degree, wherein the movement degree comprises an amount of the movement by the catheter respective to a first value, and wherein the time degree comprises an amount of time respective to a second value that the movement degree remains under the first value;

receive during the medical procedure, electrical signals captured by the catheter in correlation to the catheter stability information;

determine, during the medical procedure, accuracy and consistency of the electrical signals of the catheter based on the catheter stability information and stability information collected during a plurality of other medical procedures that were performed prior to the medical procedure, wherein the stability information for the plurality of the other medical procedures that are each stored in the memory; and determine, during the medical procedure, the location in space of the catheter based on the accuracy and consistency determined.

14. The system of claim 13, wherein the one or more processors are further collectively configured to:
save a portion of the electrical signals captured by the catheter that correspond to when the catheter stability information indicates that the catheter is stable.

15. The system of claim 13, wherein the one or more processors are further collectively configured to:
discard a portion of the electrical signals captured by the catheter that correspond to when the catheter stability information indicates that the catheter is unstable.

16. The system of claim 13, wherein the one or more processors are further collectively configured to determine the movement by the catheter.

17. The system of claim 13, wherein the one or more processors are further collectively configured to acquire additional information in conjunction with determining the catheter stability information during a real-time procedure.

18. The system of claim 13, wherein the one or more processors are further collectively configured to utilize a bit buffer to store the electrical signals and the catheter stability information.

19. The system of claim 18, wherein the bit buffer comprises a coded or calculated location in the memory.

20. The system of claim 13, wherein the catheter stability information is configurable based on a user input.

* * * * *